United States Patent [19]

Swaney

[11] 3,740,720

[45] June 19, 1973

[54] METHOD ADAPTED FOR CONTINUALLY UPDATING INFORMATION ON A MAGNETIC TAPE

[75] Inventor: C. Barnett Swaney, Wappingers Falls, N.Y.

[73] Assignee: International Business Machines Corporation, Armonk, N.Y.

[22] Filed: Jan. 25, 1971

[21] Appl. No.: 109,493

[52] U.S. Cl. ............................................ 340/172.5
[51] Int. Cl. ........................................... G11b 15/18
[58] Field of Search ................................ 340/172.5

[56] References Cited

UNITED STATES PATENTS

| | | | |
|---|---|---|---|
| 3,533,071 | 10/1970 | Epstein | 340/172.5 |
| 2,975,407 | 3/1961 | O'Brien | 340/172.5 X |

OTHER PUBLICATIONS

IBM Publication 2803 1,2 Fetom, 9/69 pages 1–10, 1–13, 3–18, 3–19.

*Primary Examiner*—Paul J. Henon
*Assistant Examiner*—Paul R. Woods
*Attorney*—Hanifin and Jancin and Kenneth R. Stevens

[57] ABSTRACT

A method capable of continually rewriting or updating data into desired record areas delineated by conventional inter-record-gaps by (1) reading the records to be updated, where $m =$ the number of record areas to be updated, (2) moving in a reverse direction or backspacing the tape $m + 1$ times so as to position the reading and writing heads over a record area external to the m group of record areas, (3) reading the external record area, and (4) writing into the m group of record areas in order to operate the system in a legitimate read-write mode.

5 Claims, 6 Drawing Figures

Patented June 19, 1973 3,740,720

INVENTOR
C. BARNETT SWANEY

BY Kenneth R. Stevens
ATTORNEY

METHOD ADAPTED FOR CONTINUALLY UPDATING INFORMATION ON A MAGNETIC TAPE

BACKGROUND OF THE INVENTION

This invention relates to a record system, and more particularly to a method for updating information on a conventional magnetic tape and tape drive system.

In the past, magnetic tape and magnetic tape drive mechanisms have been conventionally operative to store information by providing a plurality of record areas on a magnetic tape separated by inter-record-gaps (IRG). Information or data is readily written onto the magnetic tape. However, a problem always has existed when attempting to update information in selected record areas. All previous attempts to overcome this problem have been extremely cumbersome, time consuming, and costly. For example, one technique requires that the information be stored in the record areas on the magnetic tape and also in a separate memory, such as core storage. Of course, long segments of the magnetic tape can be updated by starting at the tape beginning, erasing the previous information in the record areas, and then completely rewriting over all of the erased record areas. Again, this approach is very time consuming and requires additional hardware.

The problem of selectively updating a single record area or a limited block of record areas is imposed due to electrical and mechanical limitations of most tape drive systems. FIGS. 1 and 1A illustrate the prior art problem when attempting to selectively update record areas using conventional tape drive mechanisms.

In FIG. 1, the magnetic tape medium (T) is moved to the left in order to read RECORD 3 and then is automatically stopped so as to position the read (R), write (W), and erase (E) heads in the illustrated position. Next, a backspace command reverses the tape in the direction of the arrow so as to stop the R, W and E heads substantially in the position illustrated in FIG. 1A. Then, a write command is effective to write new information into the RECORD 3 area. However, the problem of "forward creep" causes the updated information to be shifted to the right as illustrated by the shaded portion in FIG. 1A. "Forward creep" is a cumulative problem since repetitive updating of information in RECORD 3 causes the entire RECORD 3 to successively step to the right and this movement eventually will destroy the information in RECORD 4 either by writing directly over it or by erasing it with the erase head. Accordingly, the sequence of a backspace followed by a write operation is considered a prohibitive or illegal sequence of commands, and in the past, its use is ineffective to selectively and repeatedly update specified record areas.

The physical explanation for this "forward creep" phenomena is based on the electrical and mechanical characteristics of the tape drive system operative to move the magnetic tape in relationship to the R, W, and E heads. Under a backspace-write sequence of commands, tape drive systems are designed to possess an inherent dynamic time lag between the time the magnetic tape begins to move and the time at which the W head becomes energized to commence writing information on the magnetic tape. This dynamic time delay T1 is designed into the system in order to insure that the W head does not begin writing information into a preceding record area after a backspace command. For example, after the backspace command illustrated in FIG. 1A, the time lag insures that the W head is not over the unselected RECORD 2 so as to result in the erroneous destruction of information therein. This is contrasted to legimate tape commands wherein a tape is successively moving in a given direction, for example, write-write, read-write, write tape mark-write, and thus the write head is always positioned beyond the previously accessed record area. As a result, systems are designed to initiate the execution of successive commands within a shorter time period than T1 because it is unnecessary to safeguard against the write head being over the previously accessed record area.

SUMMARY OF INVENTION

Therefore, it is an object of the present invention to provide a new and novel method for selectively operating a magnetic tape and tape drive mechanism adaptable to selectively and repetitively update information on desired record areas.

In accordance with the aforementioned object, the present invention provides a method of rewriting or updating data into an $m$ group of record areas on a magnetic tape medium which stores a plurality of record areas delineated by inter-record-gaps by (1) reading the record areas to be updated, where $m = 1$, or 2, . . . or $n$, (2) moving the record areas in an opposite direction or backspacing the magnetic tape medium $m + 1$ times for positioning reading and writing means over a record area external to the $m$ group, and then reading the external record, and (3) writing into the $m$ group of record areas in order to update the information therein by placing the magnetic tape and tape drive mechanism in a legitimate read-write command sequence.

DESCRIPTION OF THE PREFERRED EMBODIMENT

Figure 1:
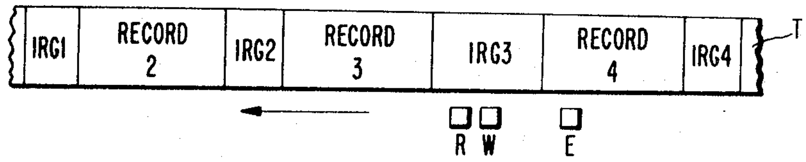
FIG. 1 PRIOR ART
FIGS. 1 and 1A are schematic representations of a magnetic tape and tape drive mechanism and illustrates the prior art problem when attempting to selectively update record areas.
Figure 1A:
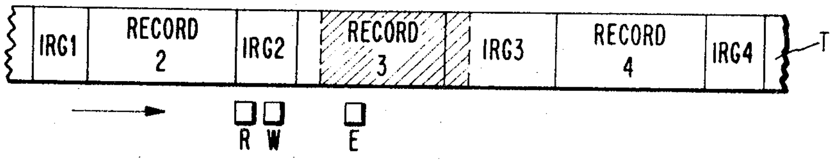
FIG. 1A PRIOR ART
Figure 2:
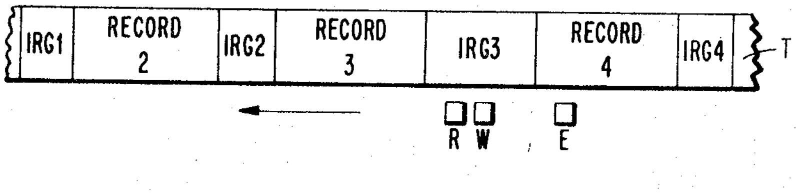
FIGS. 2–2C schematically represents a magnetic tape and tape drive system and the steps for selectively updating information on desired record areas according to the present invention.
Figure 2A:
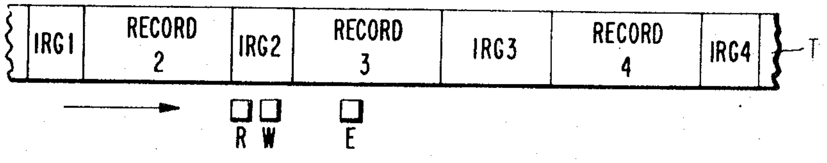
Figure 2B:
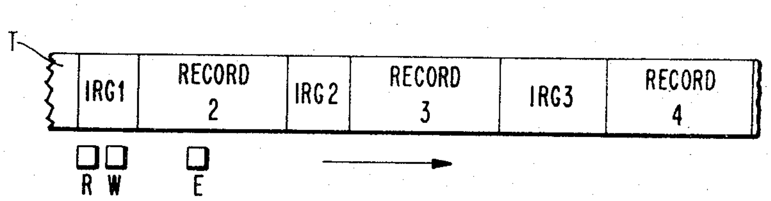
Figure 2C:
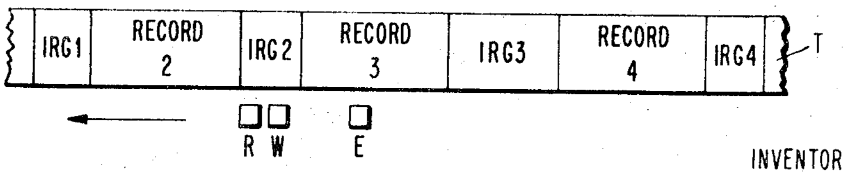

Now referring to FIGS. 2–2C, these figures illustrate the improved method of information updating into the tape T. Assuming it is desired to selectively update RECORD 3, a first read command moves the tape to the left past the read head R in order to read the information stored in RECORD 3. This command automatically stops the tape substantially in the position illustrated in FIG. 2.

Next, a backspace command reverses the tape in the direction indicated by the arrow so as to position the R and W heads generally in the area of IRG 2. This operation is followed by a second backspace command so as to position the R and W heads in the position illustrated in FIG. 2B. Hence, the number of backspace commands which are necessary for the present invention is described by: number of backspace commands = $m + 1$, where $m$ is the number of record areas to be updated, and where $m = 1$, or 2, or 3, . . . or $n$.

The $m + 1$ backspace commands are followed by a read command which places the tape in a position shown in FIG. 2C. That is, the R and W heads, are positioned in the IRG 2 area to the right of RECORD 2.

Finally, a write command causes the new information or data to be rewritten into RECORD 3 by the write head W. This sequence of commands successfully rewrites or updates information in the selected RECORD 3 without the problem of "forward creep."

This sequence of commands is effective because conventional tape and tape drive systems are placed in the legitimate read-write sequence, as previously discussed. Accordingly, the sequence of commands of the present invention avoids the illegal backspace-write sequence of the prior art, and allows for selective updating of record areas by operating the tape and tape drive mechanism in the legitimate or legal sequence of a read command followed by a write command.

In tape and tape drive systems, the read and write heads are virtually touching each other while the erase head is spaced from the write head a suitable distance, for example, three-quarters of an inch, and the erase head is operative during a write operation. In the above example, RECORD 4 might contain information which is not to be altered or destroyed. Thus when employing the updating method of the present invention, it is important to prevent the erase head from destroying information in the adjacent record area relative to the record areas which are being updated. This result is easily obtained by insuring that the inter-record-gap which immediately follows the records to be updated is of a length greater than the distance between the write and erase heads. Thus if the distance between the write and erase heads is approximately three-quarters of an inch, the IRG 3 distance should be sufficiently greater than three-quarters of an inch in order to prevent destruction of the information in RECORD 4 by the erase head E as the write head is writing at the end of RECORD 3. A user only is required to enlarge the inter-record-gap which immediately follows the single record area or block of record areas which are to be updated. All other inter-record-gaps can be formed of conventional widths in order to enjoy maximum utilization of the tape area.

The method of the present invention is illustrated by updating a single record area, but obviously a plurality of record areas can be updated by the same method by using $m + 1$ successive backspace commands.

The present invention is capable of implementation with many well-known prior art tape drive hardware systems, for example, the IBM 2400 Series, 2401 Model 3, 2402 Model 1, which were available to the public prior to the present invention. Additional hardware implementation information is also available in the manual entitled "IBM System/360 Component Description 2400 Series Magnetic Tape Units, 2803/2804 Tape Controls, and 2816 Switching Unit, Model 1," Copyright—International Business Machines Corp. 1970.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of rewriting or updating data into an $m$ group of record areas on a medium storing a plurality of record areas, the record areas being delineated by conventional inter-record-gaps comprising the steps of:

a. reading an m group of record areas by moving the medium in a first direction in relationship to reading and writing means, where $m = 1$, or 2, or 3, . . . or $n$, b. moving the medium in a direction opposite to the first direction at least $m + 1$ record areas for positioning the reading and writing means over a first record area external to the $m$ group of record areas, c. reading the first record area, and d. writing data into the m group of record areas in order to update the information therein.

2. A method as in claim 1 wherein the moving step comprises a backspacing operation.

3. A method as in claim 1 wherein the moving step comprises a read backward operation.

4. A method of selectively rewriting or updating data into an m group of record areas on a magnetic tape medium having a plurality of record areas delineated by conventional inter-record-gaps, where $m = 1$, or 2, or 3 . . . or $n$, comprising the steps of:

a. selecting a tape drive system having means for reading and writing onto the magnetic tape medium, b. reading m record areas by moving the magnetic tape medium in a first direction in relationship to the means for reading and writing, c. reversing the magnetic tape medium in a second direction opposite to the first direction over $m + 1$ record areas so as to position the means for reading and writing over a first record area external to the $m$ group of record areas, d. reading the first record area, and followed by, e. writing data into the m group of record areas in order to selectively update the data in the m group of record areas.

5. A method of selectively rewriting or updating data into an m group of record areas on a magnetic tape medium having a plurality of record areas delineated by conventional inter-record-gaps, where $m = 1$, or 2, or 3 . . . or $n$, as in claim 4 and further comprising the steps of:

a. selecting a tape drive system having means for reading, writing, and erasing the magnetic tape medium, the reading, writing, and erasing means being spaced from each other, b. locating a specific inter-record-gap adjacent to the end of the last record area in the m group of record areas, and c. forming the specific inter-record-gap of sufficient length relative to the spacing between the means for reading and writing, and the means for erasing in order to prevent the erasing means from inadvertently destroying data located in a record area adjacent to the specific inter-record-gap and external to the m group of record areas during the method of selectively rewriting or updating data into an $m$ group of record areas.

* * * * *